US005953645A

United States Patent [19]

Grondahl

[11] Patent Number: 5,953,645

[45] Date of Patent: Sep. 14, 1999

[54] SAMPLING PHASE DETECTOR AND MULTIPLE FREQUENCY BAND TERMINATION CIRCUIT AND METHOD

[75] Inventor: Christopher David Grondahl, Chandler, Ariz.

[73] Assignee: Motorola, Inc., Schaumburg, Ill.

[21] Appl. No.: 09/008,994

[22] Filed: Jan. 20, 1998

[51] Int. Cl.[6] ................................ H04B 1/28; H01P 1/26

[52] U.S. Cl. ......................... 455/333; 333/22 R; 455/330

[58] Field of Search ............................. 333/22 R; 326/30

[56] References Cited

U.S. PATENT DOCUMENTS

| | | | |
|---|---|---|---|
| 4,009,456 | 2/1977 | Hopfer | 333/81 A |
| 4,647,877 | 3/1987 | Thompson | 333/22 R |
| 4,951,011 | 8/1990 | Heckaman et al. | 333/33 |
| 5,422,615 | 6/1995 | Shibagaki et al. | 333/246 |
| 5,614,873 | 3/1997 | Hageraats | 333/22 R |

FOREIGN PATENT DOCUMENTS

| | | | |
|---|---|---|---|
| 2548207 | 5/1977 | Germany | 333/22 R |
| 1-190003 | 7/1989 | Japan | 333/22 R |
| 6-152206 | 5/1994 | Japan | 333/22 R |

*Primary Examiner*—Paul Gensler
*Attorney, Agent, or Firm*—Gregory J. Gorrie

[57] ABSTRACT

A multiple band termination circuit, comprising a first resistor coupled in signal communication with an input and an open stub to form a nominal termination at a high frequency band, and a second resistor coupled in series to the first resistor with a high impedance transmission line, the second resistor and the first resistor cooperating together to form a nominal termination at a low frequency band.

23 Claims, 1 Drawing Sheet

SAMPLING PHASE DETECTOR AND MULTIPLE FREQUENCY BAND TERMINATION CIRCUIT AND METHOD

FIELD OF THE INVENTION

This invention relates generally to the field of resistors and more particularly to chip resistor termination circuits.

BACKGROUND OF THE INVENTION

The prior art is replete with various apparatus operative for facilitating both high frequency signal termination and low frequency signal termination. However existing devices are expensive, difficult to implement, and often fail to attain the desired impedance at low and high frequencies, especially at microwave frequencies. Therefore, what is needed is a new and improved method and apparatus for providing multiple-band signal termination.

BRIEF DESCRIPTION OF THE DRAWINGS

The specific objects and advantages of the present invention will become readily apparent to those skilled in the art from the following detailed description thereof taken in conjunction with the drawings in which.

DETAILED DESCRIPTION OF THE DRAWINGS

The present invention provides, among other things, an apparatus and method for providing multiple-band termination. In a further and more specific aspect, the present invention includes the provision of a circuit to achieve multiple-band matched or reflection-less termination at a plurality of frequency bands in a microwave integrated circuit environment. In operation, the present invention may be used to provide multiple-band termination on a K-band sampling phase detector to be discussed shortly, power splitters and power combiners with isolated parts, etc.

Figure 1:
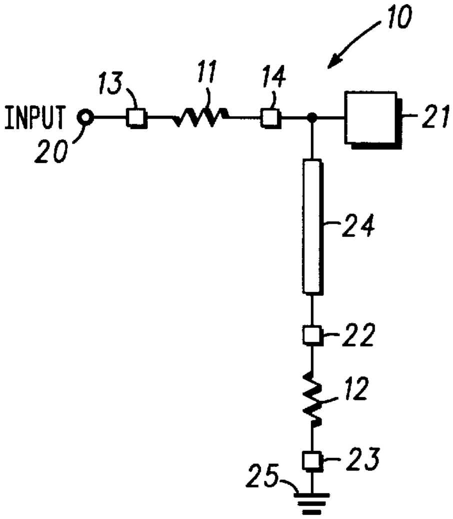
FIG. 1 illustrates a multiple-band termination circuit, in accordance with a preferred embodiment of the present invention.

With attention directed to FIG. 1, illustrated is a multiple-band termination circuit (MBTC) generally designated by the reference character 10, in accordance with a preferred embodiment of the present invention. MBTC 10 is generally comprised of first and second resistors 11 and 12 coupled in series and tuned to provide a desired termination impedance at a plurality of frequency bands such as a high frequency band and a low frequency band. First and second resistors 11 and 12 may each be provided in the form of a discrete, readily available and conventional chip resistor.

Regarding a preferred embodiment, resistor 11 is mounted between first and second resistor mounting pads 13 and 14. Resistor 11 is further coupled intermediate an input port 20 and a conventional open stub 21. In this specific example, resistor 11 and open stub 21 cooperate together to form a nominal termination at a high frequency band, herein specifically defined as a first tier termination circuit. Second resistor 12 is mounted between first and second resistor mounting pads 22 and 23 and is coupled in series with first resistor 11 using a section of high impedance transmission line 24. As shown in FIG. 1, resistor 12 is also coupled with a ground 25. In this specific example, the series connection of first and second resistors 11 and 12 forms a nominal termination at a low frequency band, herein specifically defined as a second tier termination circuit.

Consistent with the foregoing, MBTC 10 operates to achieve a desired impedance at a plurality of frequency bands, such as a high frequency band and a low frequency band. Open stub 21 tunes or optimizes MBTC 10 in order to attain the desired termination impedance in each frequency band. Transmission line 24 operates to isolate high frequency signals in the first tier termination circuit while allowing only low frequency signals to pass through to second resistor 12.

In microwave signal applications, and by modeling first and second resistors 11 and 12 at microwave frequencies, MBTC 10 is exemplary for providing matched termination in a high frequency band ranging from 10–30 Gigahertz (GHz) and a low frequency band ranging from 0–2.1 GHz. The foregoing high and low frequency bands are intended to be regarded as examples, and are not intended to be limiting in light of the nature and scope of the present invention as herein specifically disclosed. Regarding high frequency microwave signals ranging from 10–30 GHz, the impedance of first resistor 11 may be less than the impedance of the high frequency microwave signal received by input 20. In a specific example, to provide matched termination of a 50-ohm impedance microwave signal having a frequency of 24 GHz, first resistor 11 need only have an impedance of 20 ohms. In this regard, a 20-ohm first resistor 11 acts like a 50-ohm resistor in high frequency microwave applications. However, to ensure match or reflection-less termination at high frequency microwave applications, open stub 21 operates to tune or optimize the first tier termination circuit.

Regarding low frequency microwave signals ranging from 0–2.1 GHz, the sum of the impedance of first resistor 11 and the impedance of second resistor 12 may be provided to substantially equal the impedance of the low frequency microwave signal received by input 20 to thereby attain matched or reflection-less termination at low frequency microwave applications. In a specific example, to provide matched termination of a 50 ohm impedance microwave signal having a frequency of 690 megahertz (MHz) with first resistor 11 provided as a 20 ohm resistor consistent with the foregoing example relating to high frequency microwave signals, second resistor may be provided as a 30 ohm resistor. In this regard, the sum of the impedance of first resistor 11 and second resistor 12 will equal the 50-ohm impedance of the incoming low frequency microwave signal to thereby attain a matched or reflection-less termination.

Figure 2:
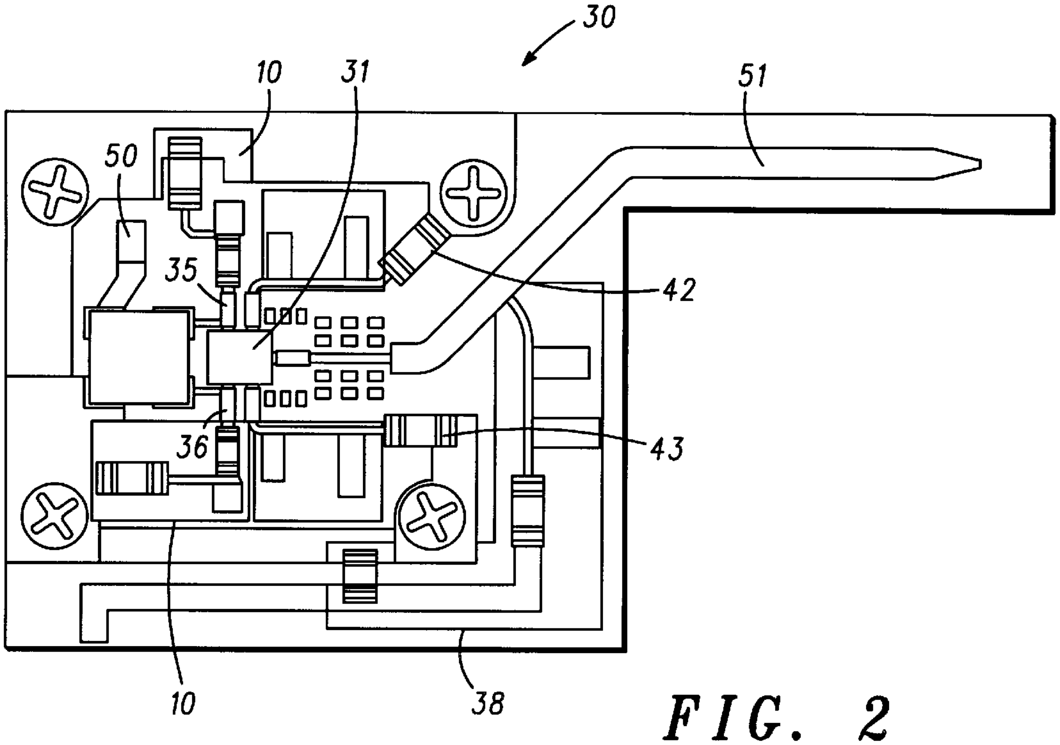
FIG. 2 illustrates a layout of a sampling phase detector hybrid circuit employing the multiple-band termination circuit of FIG. 1.

In microwave applications, MBTC may be mounted with a microwave integrated circuit (MIC). However, and as previously mentioned, MBTC may also be used to provide multiple-band termination on a K-band sampling phase detector. In this regard, attention is now directed to FIG. 2 illustrating a layout of a sampling phase detector hybrid circuit (SPD) employing the multiple-band termination circuit of FIG. 1, SPD being generally designated by the reference character 30.

Figure 3:
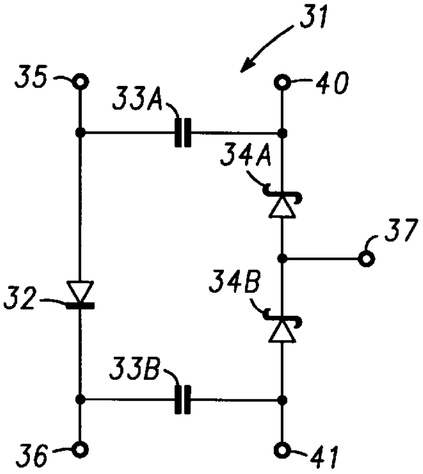
FIG. 3 illustrates a schematic diagram of a sampling phase detector integrated circuit suitable for use with the sampling phase detector hybrid circuit of FIG. 2.

SPD 30 is generally comprised of a sampling phase detector integrated circuit (SPDIC) 31. With additional reference in relevant part to FIG. 3 illustrating a schematic diagram of SPDIC 31, SPDIC 31 includes a step recovery diode (SRD) 32, first and second capacitors 33A and 33B, and first and second Schottky diodes 34A and 34B. In this specific example, SPDIC 31 is driven with a balanced LO signal at ports 35 and 36 and is operated in a balanced mode to reduce the time constants of capacitors 33A and 33B. A radio frequency (RF) signal to be sampled may be applied at node 37, and an intermediate frequency (IF) signal may be coupled from node 37 through an IF filter 38. As the LO signal drives SRD 32 into a reverse bias, it creates a step function that is differentiated by capacitors 33A and 33B to create a pulse at Schottky diodes 34A and 34B. The pulse at Schottky diodes 34A and 34B forward biases them to allow them to conduct to create a voltage pulse at node 37 having an amplitude proportional to the RF signal. The duration of the pulse is much less than the period of the RF signal and the pulse therefore represents a sample of the RF signal. The pulses are applied to IF filter 38 that outputs an IF signal having a frequency less than the LO frequency. If the LO signal is harmonically related to the RF signal, then every pulse will sample the RF signal at the same point in the RF cycle and the IF signal becomes a direct current (DC) signal. As the LO signal moves away from a harmonically related condition, the IF frequency will become equal to the difference between the RF frequency and the closest harmonic of the LO signal. In the SPD of FIG. 2, the LO frequency may, for example, be 690 MHz as designated by the reference character 50 and the RF frequency 24.15 GHz as designated by the reference character 51, RF frequency 51 being thirty-five times greater than LO frequency 50. In this specific example, as the LO signal becomes non-harmonically related, the IP signal takes on the frequency given in the following equation:

$$Freq_{IF}=Freq_{RF}-35\times freq_{LO}$$

To function properly, SPDIC 31 must have the proper terminations and impedance matching the LO signal and RF signal sources. Nodes 40 and 41 of SPDIC 31 must provide an open circuit to the RF frequency so the sample pulse does not become loaded down. Resistors 42 and 43 provide ground return and bias alignment for Schottky diodes 34A and 34B which are coupled to with nodes 40 and 41. Resistors 42 and 43 are preferably in the range of several K-Ohms, but these chip resistors do not provide large impedance at the RF frequency of, in this specific example, 24.15 GHz. Therefore, tuning circuits on nodes 40 and 41 are required. Node 37 of SPDIC 31 should be impedance matched to the RF source to provide maximum power to Schottky diodes 34A and 34B. IF filter 38 must allow only frequencies below the LO frequency to pass to the IF port and must also not load the RF source. A transformer on nodes 35 and 36 impedance matches the SRD 32 to the LO source. Nodes 35 and 36 need to be terminated at 50 Ohms at the LO frequency so that the LO source can see a well-matched load. Nodes 35 and 36 also need to be terminated in 50 Ohms at the RF frequency so that the RF signal can remain matched during each pulse. The terminations on nodes 35 and 36 therefore need to provide a 50 Ohm load at both the LO frequency and the RF frequency, and thus the need and exemplary utility of MBTC 10, one shown mounted in signal communication with port 35 and one shown mounted in signal communication with port 36 on SPD 30 as set forth in FIG. 2.

In summary, the present invention provides an apparatus and method for achieving multiple-band matched or reflection-less termination at a plurality of frequency bands in a microwave integrated circuit environment. The MBTC 10 utilizes a straightforward and inexpensive construction implementing readily available discrete components. Although the present may be constructed of discrete components as herein specifically described, the present invention may be fabricated or otherwise incorporated into an integrated component if desired, such as terminations fabricated on a monolithic microwave integrated circuit or terminations utilizing absorber material. However, both of the foregoing types of terminations would require application-specific components and/or tooling.

The present invention has been described above with reference to a preferred embodiment. However, those skilled in the art will recognize that changes and modifications may be made in the described embodiments without departing from the nature and scope of the present invention. Various changes and modifications to the embodiment herein chosen for purposes of illustration will readily occur to those skilled in the art. To the extent that such modifications and variations do not depart from the spirit of the invention, they are intended to be included within the scope thereof which is assessed only by a fair interpretation of the following claims.

Having fully described the invention in such clear and concise terms as to enable those skilled in the art to understand and practice the same, the invention claimed is recited below:

What is claimed is:

1. A multiple-band termination circuit, comprising:

a first resistive element coupled with an input and an open stub to form a nominal termination at a high frequency band;

a second resistive element coupled to ground; and a high impedance transmission line coupled between the second resistive element and the open stub, the second resistor and the first resistor cooperating together to form a nominal termination at a low frequency band.

2. The multiple-band termination circuit of claim 1, wherein the high frequency band includes a frequency in the range of 10–30 GHz.

3. The multiple-band termination circuit of claim 1, wherein the low frequency band includes a frequency in the range of 0–2.1 GHz.

4. The multiple-band termination circuit of claim 1, wherein the first and second resistive elements are mounted with a microwave integrated circuit.

5. The multiple-band termination circuit of claim 1, wherein the first and second resistive elements are mounted with a sampling phase detector unit.

6. A multiple-band termination circuit, comprising:

a first resistor coupled in signal communication with an input and an open stub to form a nominal termination at a high frequency band; and a second resistor coupled in series to the first resistor with a high impedance transmission line, the second resistor and the first resistor cooperating together to form a nominal termination at a low frequency band, wherein:

the first resistor includes an impedance; and the input includes an impedance, wherein the impedance of the first resistor being less than the impedance of the input.

7. A multiple-band termination circuit, comprising:

a first resistor coupled in signal communication with an input and an open stub to form a nominal termination at a high frequency band; and a second resistor coupled in series to the first resistor with a high impedance transmission line, the second resistor and the first resistor cooperating together to form a nominal termination at a low frequency band, wherein:

the input includes an impedance;

the first resistor includes an impedance; and the second resistor includes an impedance, wherein the sum of the impedance of the first and second resistors being substantially equal to the impedance of the input.

8. The multiple-band termination circuit of claim 7, wherein:

the input includes an impedance of 50 ohms;

the first resistor includes an impedance of 20 ohms; and the second resistor includes an impedance of 30 ohms.

9. A monolithic microwave integrated circuit for providing multiple-band termination comprising:

a first resistive element coupled with the integrated circuit in signal communication with an input and an open stub to form a nominal termination at a high frequency band;

a second resistive element; and a high impedance transmission line coupled between the second resistive element and the open stub, the second and the first resistive elements cooperating together to form a nominal termination at a low frequency band.

10. The monolithic microwave integrated circuit of claim 9, wherein the high frequency band includes a frequency in the range of 10–30 GHz.

11. The monolithic microwave integrated circuit of claim 9, wherein the low frequency band includes a frequency in the range of 0–2.1 GHz.

12. The monolithic microwave integrated circuit of claim 9, wherein the integrated circuit includes a microwave integrated circuit.

13. The monolithic microwave integrated circuit of claim 9, further comprising a sampling phase detector circuit.

14. A multiple-band termination circuit, comprising:

an integrated circuit;

a first resistor coupled with the integrated circuit in signal communication with an input and an open stub to form a nominal termination at a high frequency band; and a second resistor mounted with the integrated circuit and coupled in series with the first resistor with a high impedance transmission line, the second resistor and the first resistor cooperating together to form a nominal termination at a low frequency band, wherein:

the input includes an impedance; and the first resistor includes an impedance, the impedance of the first resistor being less than the impedance of the input.

15. A multiple-band termination circuit, comprising:

an integrated circuit;

a first resistor coupled with the integrated circuit in signal communication with an input and an open stub to form a nominal termination at a high frequency band; and a second resistor mounted with the integrated circuit and coupled in series with the first resistor with a high impedance transmission line, the second resistor and the first resistor cooperating together to form a nominal termination at a low frequency band, wherein:

the input includes an impedance;

the first resistor includes an impedance; and the second resistor includes an impedance;

the sum of the impedance of the first and second resistors being substantially equal to the impedance of the input.

16. The multiple-band termination circuit of claim 15, wherein:

the input includes an impedance of 50 ohms;

the first resistor includes an impedance of 20 ohms; and the second resistor includes an impedance of 30 ohms.

17. A method of providing multiple-band frequency termination, said method comprising the steps of:

providing a first resistor chip on a microwave integrated circuit in series with an input and an open stub to form a nominal termination at a high frequency band;

providing a second resistor chip on the integrated circuit coupled to ground; and coupling the second resistor chip and the open stub with a high impedance transmission line, the second resistor chip and the first resistor chip cooperating together to form a nominal termination at a low frequency band.

18. The method of claim 17 further comprising the step of providing a sampling phase detector circuit on the microwave integrated circuit.

19. A method of providing multiple-band termination, said method comprising the steps of:

providing an integrated circuit;

providing a first resistor chip;

mounting the first resistor chip with the integrated circuit in signal communication with an input and an open stub to form a nominal termination at a high frequency band;

providing a second resistor chip;

mounting the second resistor chip with the integrated circuit; and mounting the second resistor chip in series with the first resistor chip with a high impedance transmission line, the second resistor chip and the first resistor chip cooperating together to form a nominal termination at a low frequency band, wherein the input further includes an impedance, and wherein the step of providing a first resistor further includes the step of providing a first resistor having an impedance less than the impedance of the input.

20. A method of providing multiple-band termination, said method comprising the steps of:

providing an integrated circuit;

providing a first resistor chip;

mounting the first resistor chip with the integrated circuit in signal communication with an input and an open stub to form a nominal termination at a high frequency band;

providing a second resistor chip;

mounting the second resistor chip with the integrated circuit; and mounting the second resistor chip in series with the first resistor chip with a high impedance transmission line, the second resistor chip and the first resistor chip cooperating together to form a nominal termination at a low frequency band, wherein the input further includes an impedance, and wherein:

the step of providing a first resistor chip further includes the step of providing a first resistor chip having an impedance;

the step of providing a second resistor chip further includes the step of providing a second resistor chip having an impedance;

the sum of the impedance of the first and second resistor chips being substantially equal to the impedance of the input.

21. The method of claim 20, the input further including an impedance of 50 ohms, wherein:

the step of providing a first resistor chip further includes the step of providing a first resistor chip having an impedance of 20 ohms; and the step of providing a second resistor chip further includes the step of providing a second resistor chip having an impedance of 30 ohms.

22. A sampling phase detector comprising:

a step recovery diode coupled between a first and second local oscillator (LO) port;

a first capacitor in series with a first Schottky diode coupling the first LO port with an RF signal port;

a second capacitor in series with a second Schottky diode coupling the second LO port with the RF signal port; and a first and second multiple frequency band termination coupled respectively to the first and second LO ports, each multiple frequency band termination comprising:

a first resistive element coupled between an input and an open stub to form a nominal termination at a high frequency band;

a second resistive element coupled to ground; and a high impedance transmission line coupled between the second resistive element and the open stub, the second resistor and the first resistor cooperating together to form a nominal termination at a low frequency band.

23. The sampling phase detector as claimed in claim 22 wherein the step recovery diode, the first and second capacitors, the first and second Schottky diodes, the step recovery diode and the first and second multiple frequency band terminations are mounted on a monolithic microwave integrated circuit.

* * * * *